INVENTOR.
ROBERT W. BENSON
BY
ATTORNEY

INVENTOR.
ROBERT W. BENSON
BY [signature]
ATTORNEY

INVENTOR.
ROBERT W. BENSON
BY Norman C. Schroeder
ATTORNEY

INVENTOR.
ROBERT W. BENSON
BY Norman P. Schneider
ATTORNEY

May 5, 1964 R. W. BENSON 3,131,594

IMAGE SCANNING APPARATUS

Filed April 4, 1960 7 Sheets-Sheet 5

INVENTOR.
ROBERT W. BENSON

BY [signature]

ATTORNEY

INVENTOR.
ROBERT W. BENSON
BY [signature]
ATTORNEY

IMAGE SCANNING APPARATUS

Filed April 4, 1960 7 Sheets-Sheet 7

INVENTOR.
ROBERT W. BENSON

BY [signature]

ATTORNEY

1

3,131,594

IMAGE SCANNING APPARATUS

Robert W. Benson, Rochester, N.Y., assignor to Xerox Corporation, a corporation of New York Filed Apr. 4, 1960, Ser. No. 19,848

6 Claims. (Cl. 88—24)

This invention relates to xerography and, particularly, to improved apparatus to effect optical scanning of a microfilm image to be reproduced. More specifically this invention relates to improved apparatus for use in a xerographic reproducing machine whereby a microfilm image is optically scanned for exposure to a constantly moving xerographic plate.

In the process of xerography, for example, as disclosed in Carlson Patent 2,297,691, issued October 6, 1942, a xerographic plate comprising a layer of photoconductive insulating material on a conductive backing is given a uniform electric charge over its surface and is then exposed to the subject matter to be reproduced, usually by conventional projection techniques. This exposure discharges the plate areas in accordance with the radiation intensity that reaches them, and thereby creates an electrostatic latent image on or in the photoconductive layer. Development of the latent image is effected with an electrostatically charged, finely divided material such as an electroscopic powder that is brought into surface contact with the photoconductive layer and is held thereon electrostatically in a pattern corresponding to the electrostatic latent image. Thereafter, the developed xerographic powder image is usually transferred to a support surface to which it may be fixed by any suitable means.

Microfilm has long been established as a convenient medium for recording images of printed information and with the advent of xerography the convenience of reproducing copy from microfilm has been considerably enhanced. Xerographic machines have been developed for reproducing microfilm images and are in wide commercial use; a typical apparatus being disclosed in copending application S.N. 786,561, filed March 2, 1959, now U.S. Patent No. 2,943,523 in the name of S. R. Johanson, wherein copy is continuously reproduced from an extended microfilm web on which a plurality of images are successively spaced. In copending application S.N. 776,848, filed November 28, 1958, in the name of R. A. Hunt, apparatus is disclosed for consecutively reproducing copy from microfilm which are individually mounted on conventional record cards of the type widely used in record controlled accounting and tabulating systems.

Recently there has been developed by the Eastman Kodak Co. of Rochester, New York a new system of recording information on microfilm which is referred to as "Minicard." The film employed therein is of a high resolution fine grained film emulsion and is unique in that individual images are contained in a plurality of frames which are relatively small. The images are intended to be selectively reproduced and the film further contains an imprinted coded section by which that defines the subject matter of the images in a distinguishing manner and film selection is expedited. For example, a typical minicard film has twelve frames each containing an image and an imprinted coded section confined within an area approximately 25 millimeters long by 13 millimeters wide with each frame being approximately 6 millimeters long by 3.8 millimeters wide. Those films which are selected are placed in a hopper type retainer such as a film magazine that is adapted to be supported in a xerographic machine. From the retainer each film can individually be removed and transferred to the machine's projection system to expose images thereof for reproduction. By means of apparatus disclosed in copending application Ser. No. 19,847, filed April 4, 1960 now U.S. Patent No. 3,094,036 together herewith on frame type microfilm, such as the minicard, can have each frame-image selectively positioned alternately in the projection system and by means of a scanning apparatus constructed in accordance with the invention each selected frame-image can be optically scanned for reproduction.

2

The principal object of the invention is to improve apparatus for optically scanning a document image.

A further object of the invention is to improve apparatus for use in a xerographic machine to effect optical scanning of a document image for xerographic reproduction.

These and other objects of the invention are attained by means of the scanning apparatus of the invention which includes a platen on which a document such as microfilm is supported in the vicinity of the viewing station of an optical system. More particularly, optical scan of the image is achieved by moving the platen with the document thereon past the viewing station at a predetermined rate effected by a driven cam and follower arrangement.

A preferred embodiment of the apparatus is shown in the accompanying drawings in which.

Figure 3:
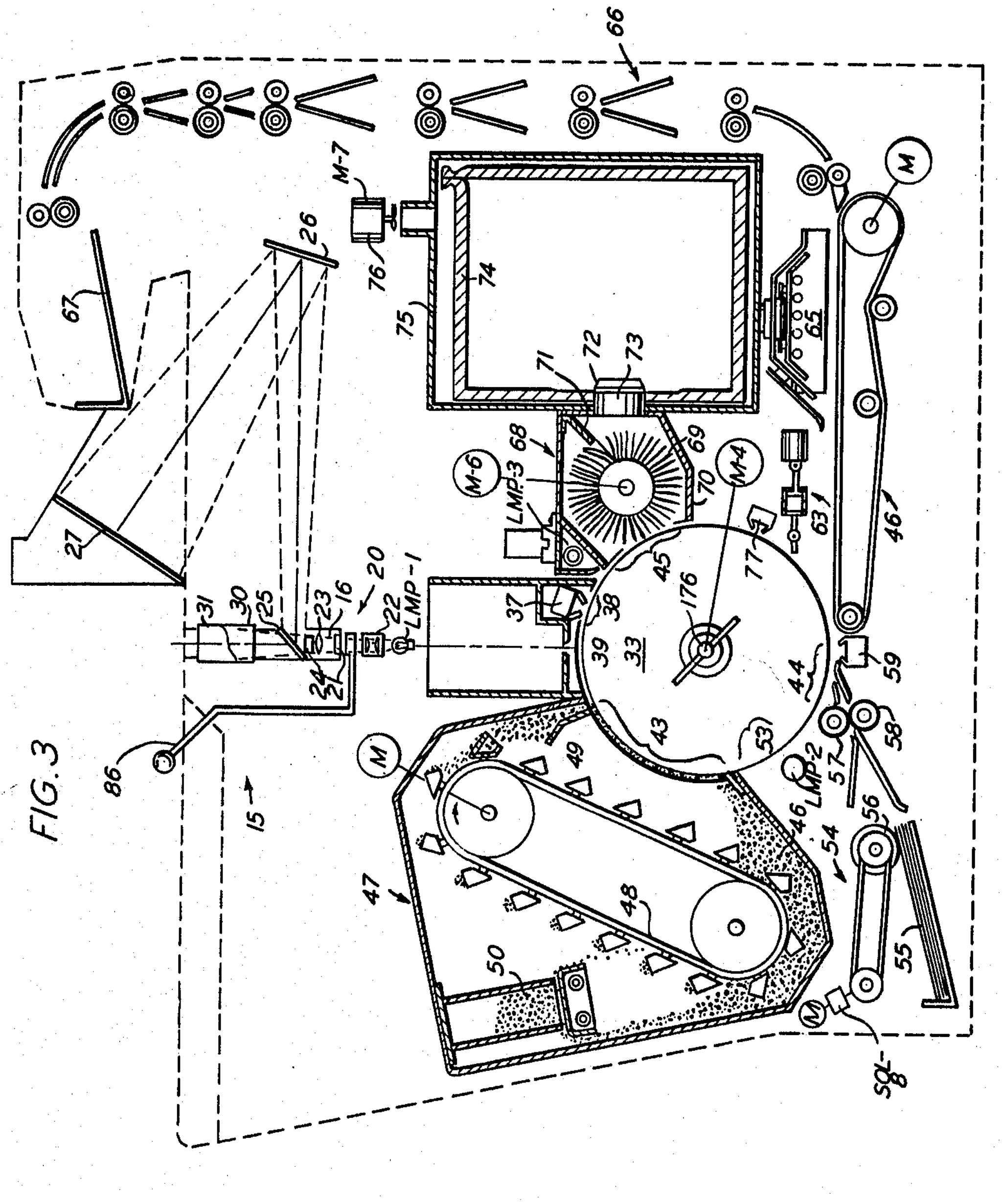
Figures 4, 5:
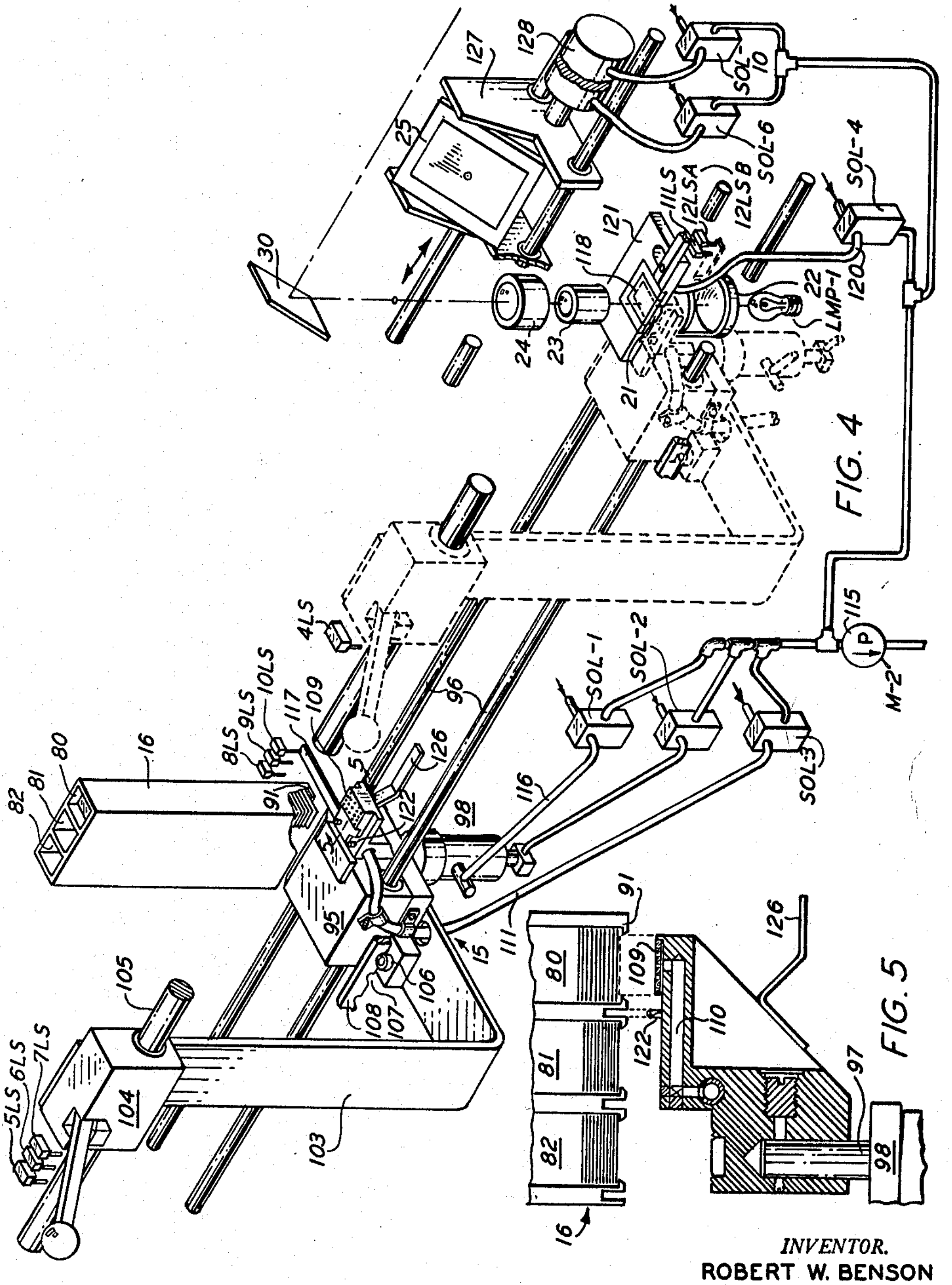
Figures 6, 7, 8:
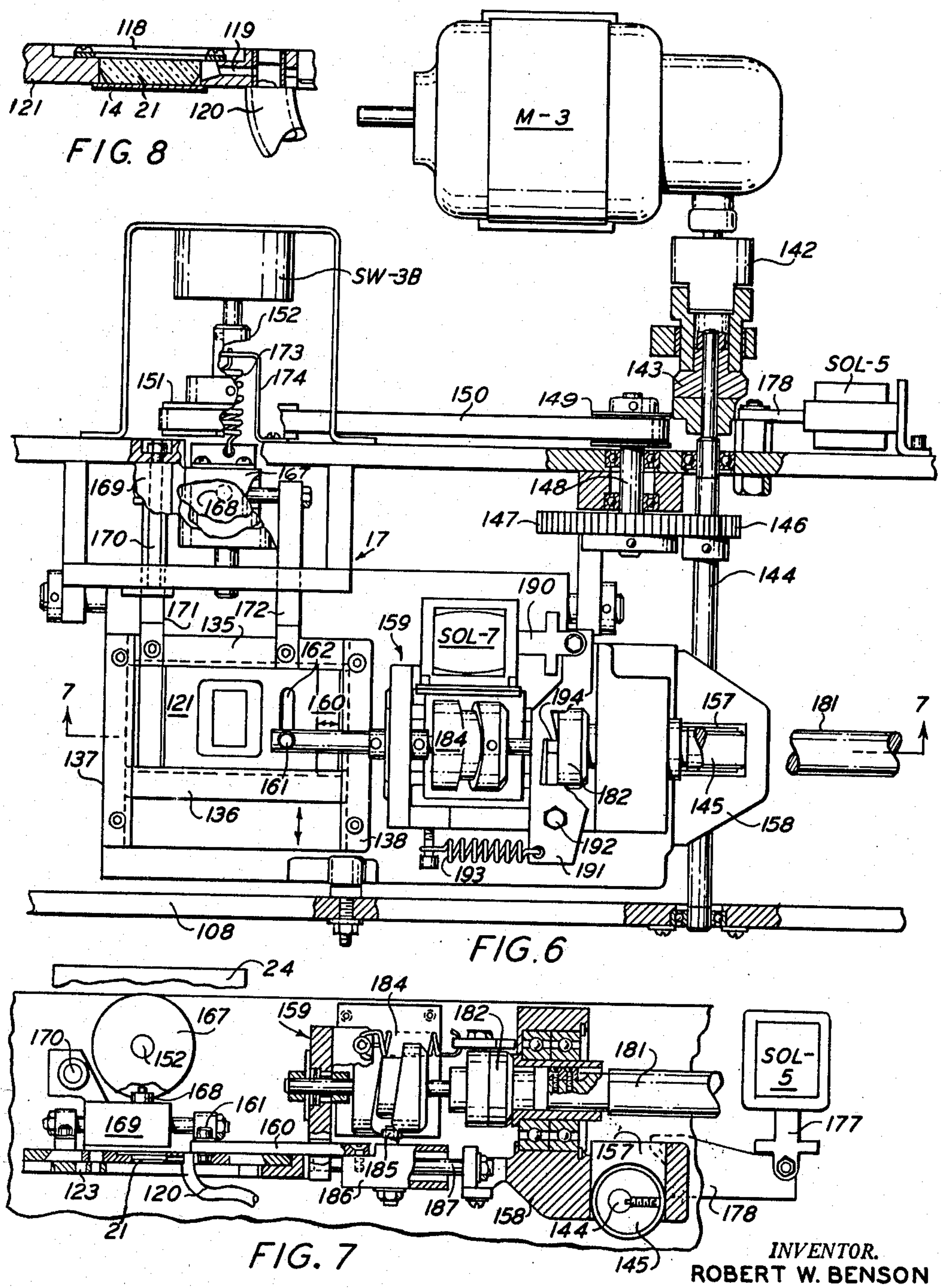

FIG. 3 schematically illustrates the components of a xerographic machine incorporating the apparatus of the invention;

FIG. 4 is an isometric view of the xerographic machine's film transfer apparatus;

FIG. 5 is an enlarged fragmentary section taken substantially on line 5—5 of FIG. 4;

FIG. 6 is a plan view of the frame selector apparatus of xerographic machine in conjunction with the image scanning apparatus of the invention.

Figure 9:
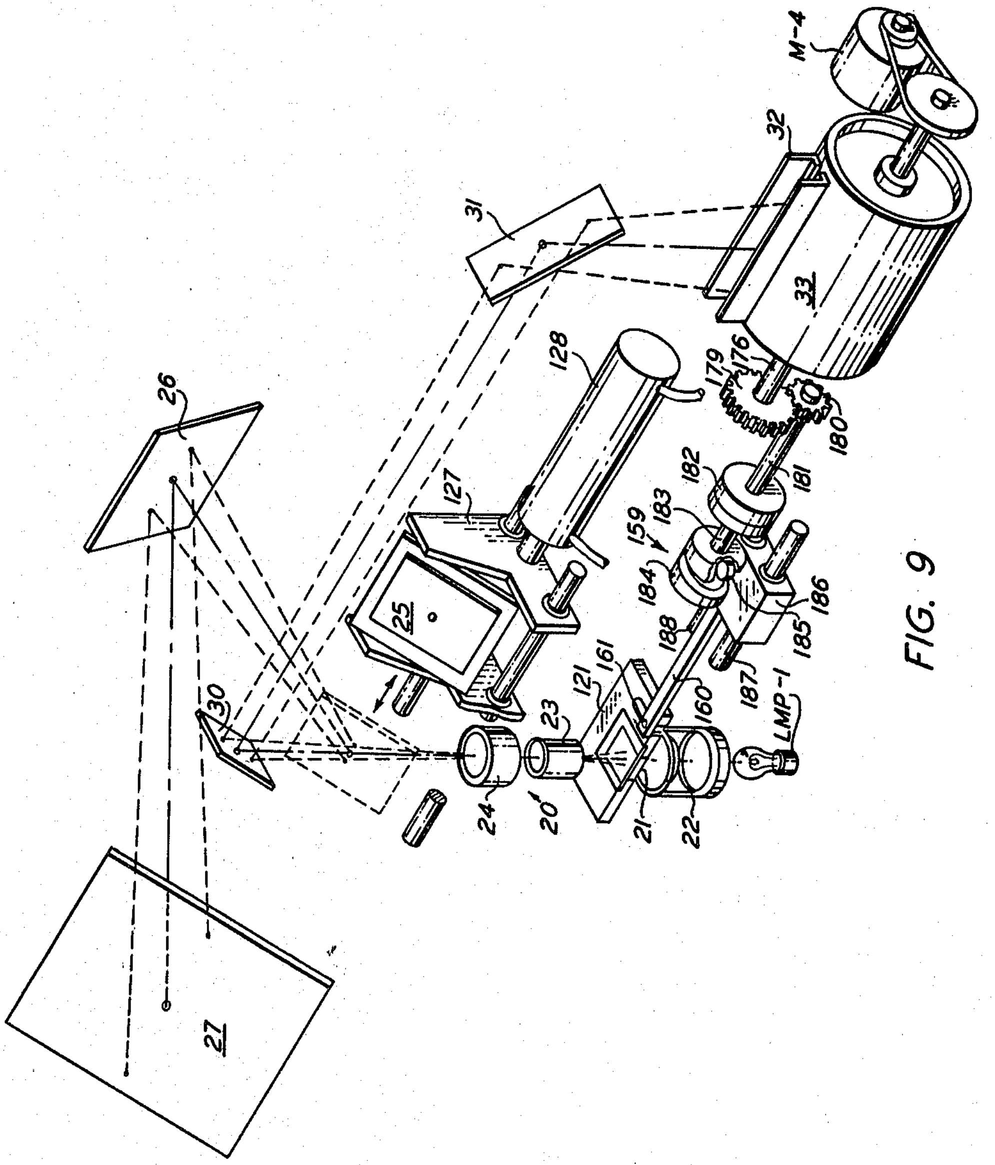
Figure 10:
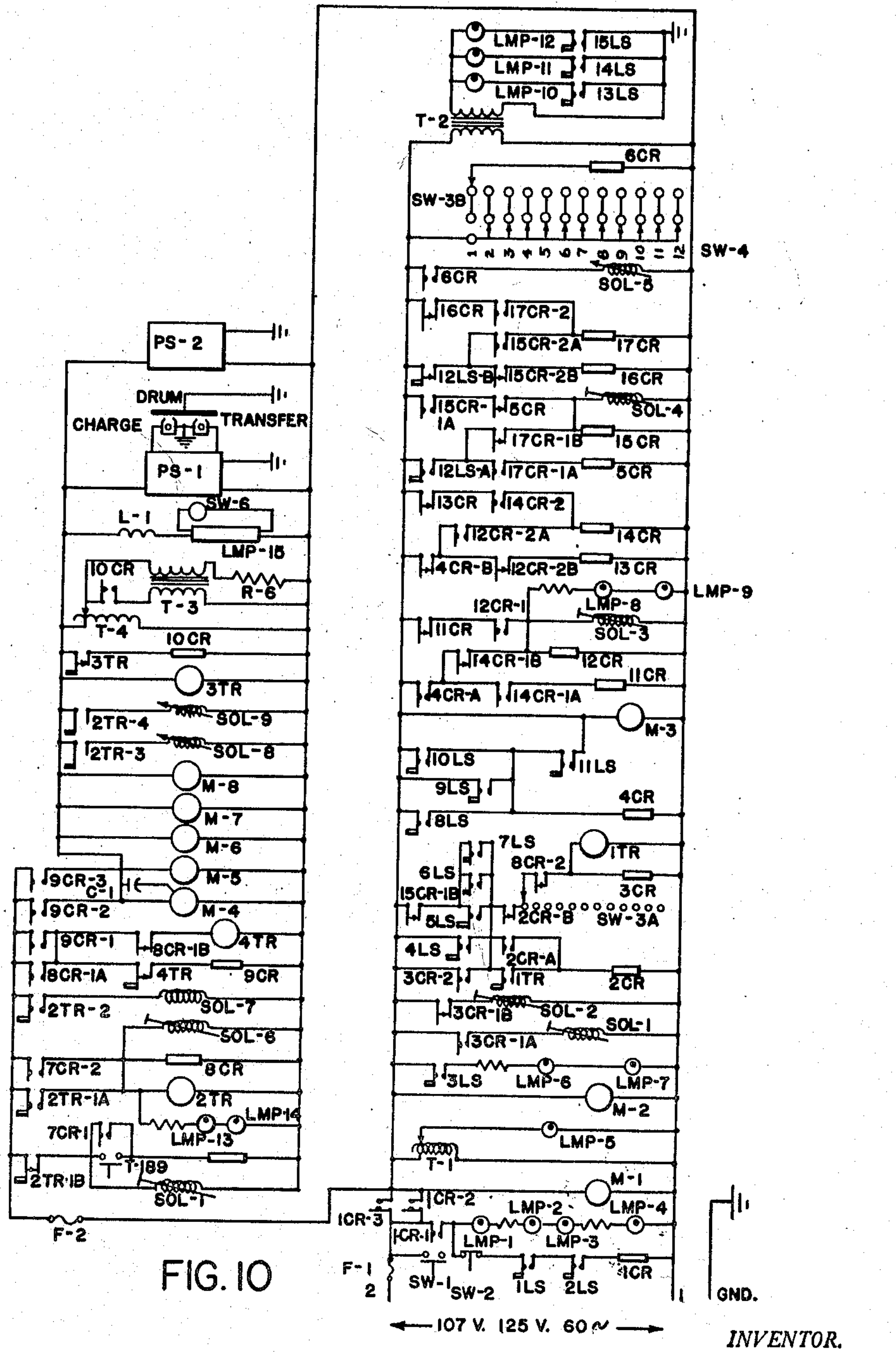

FIG. 7 is a section view taken substantially on line 7—7 of FIG. 6;

FIG. 8 is an enlarged section of the document support viewing platen illustrated in FIG. 7;

FIG. 9 isometrically illustrates the relationship between the frame selector apparatus and the projection system of the xerographic machine;

FIG. 10 is an electrical diagram; and

Figure 11:
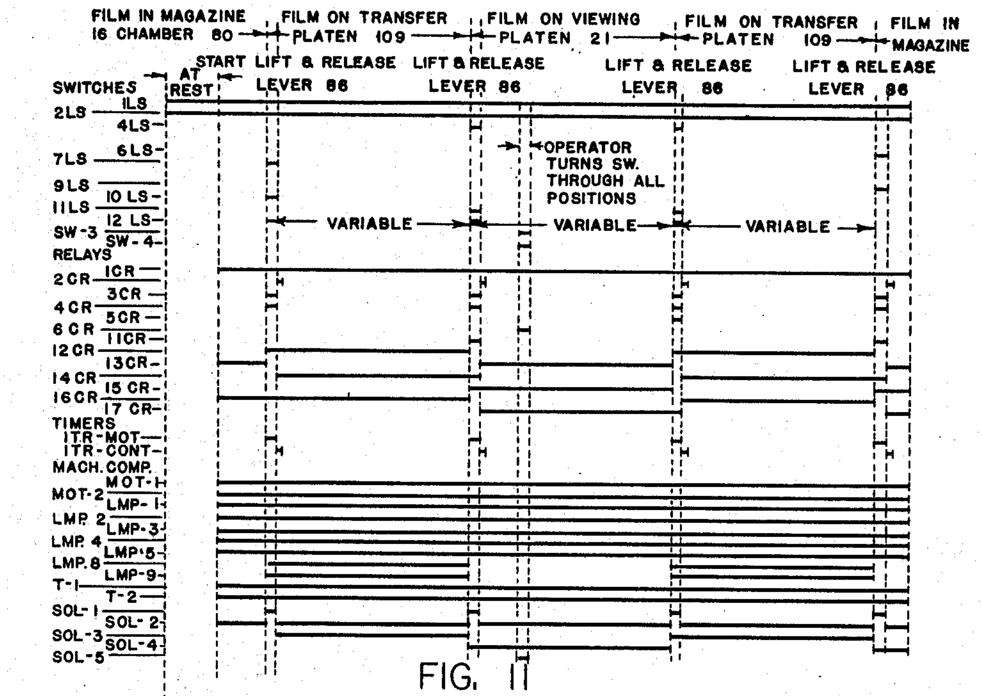
Figure 12:
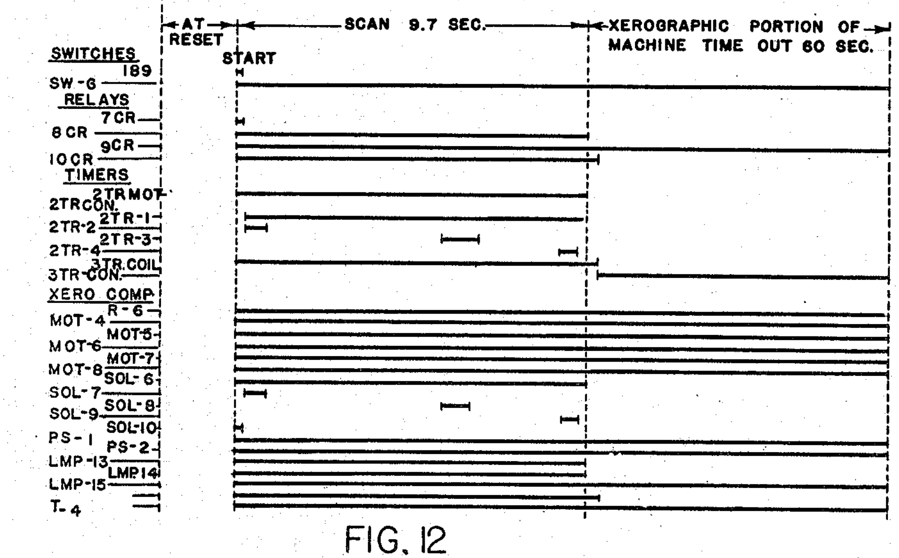

FIGS. 11 and 12 are timing diagrams in which the solid lines represent the period during which the designated component is energized.

Figure 1:
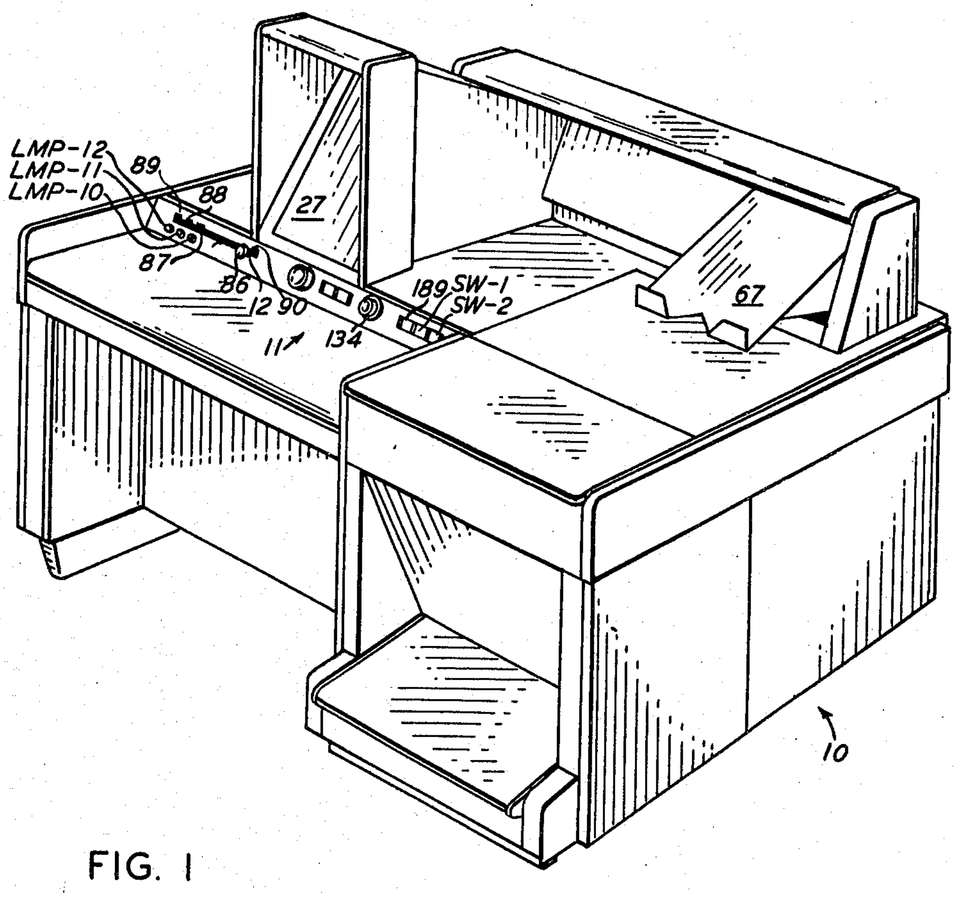
FIG. 1 is a perspective view illustrating the exterior of a xerographic machine incorporating the apparatus of the invention.

In FIG. 1 a desklike cabinet generally designated 10 is illustrated in which a xerographic reproduction apparatus and the apparatus of the invention are housed. In practice an operator is situated in front of the cabinet 10 which in FIG. 1 is regarded as being viewed from the left towards the upper right and wherefrom all the controls are mounted on a control panel 11 for ready accessibility.

For a general understanding of the xerographic processing system in which the invention is incorporated, reference is had to FIG. 3 in which the various system components are schematically illustrated. As in all xerographic systems based on the concept disclosed in the above-cited Carlson patent, a radiation image of copy to be reproduced is projected onto the sensitized surface of a xerographic plate to form an electrostatic latent image thereon. Thereafter, the latent image is usually developed with an oppositely charged developing material to form a xerographic powder image, corresponding to the latent image, on the plate surface. The powder image is then electrostatically transferred to a support surface to which it may be fused by any suitable form of fusing device, whereby the powder image is caused permanently to adhere to the support surface.

The xerographic components described herein may be an adaptation of the components disclosed in copending application S.N. 824,500, filed July 2, 1959, now U.S. Patent No. 3,062,109 in the name of Mayo et al.

Figure 2:
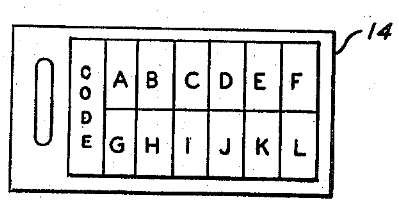
FIG. 2 illustrates a typical film of the multiple frame type which may be reproduced by the xerographic machine illustrated in FIG. 1.

In the illustrated embodiment, a multiple frame microfilm which may be of the type illustrated in FIG. 2 and designated 14 is stacked in a film magazine 16 from which it may individually be transferred by means of a film transfer apparatus generally designated 15 to a projection system generally designated 20. The transfer apparatus transfers microfilm from the magazine to viewing platen 21 of the projection system (refer also FIGS. 4 and 9) that is illuminated by projection lamp LMP–1 and includes a condenser lens 22. In order that the operator may observe each image before its reproduction, the film image is projected through objective lens 23 and dove prism 24 onto mirror 25 wherefrom the image is reflected to mirror 26 and thence to ground glass 27 (see also FIG. 1).

For reproducing the image, the xerographic apparatus is operative as described below and mirror 25, which effects image projection onto the ground glass, is removed from the optical path before the image is optically scanned for reproduction. With mirror 25 so removed an image is projected through objective lens 23 and dove prism 24 onto mirror 30 which reflects the image to mirror 31 wherefrom it is reflected downwardly through slit aperture assembly 32 onto the surface of a xerographic plate in the form of a cylindrical drum 33. With images of the "minicard" size, reference to above, reproduction of approximately 58 diameters has been achieved using an objective lens of 18 millimeter focal length. Through a drive mechanism described below, the film is moved past the optical axis of the projection system so as to permit an image thereof positioned by the image selector apparatus to be optically scanned for reproduction by the image scanning apparatus of the invention.

The xerographic apparatus is described more particularly in the above cited Mayo et al. application and as shown schematically in FIG. 3, includes a xerographic plate having a photoconductive layer or light-receiving surface on a conductive backing and formed in the shape of a drum, generally designated by numeral 33, which is mounted on a shaft 176 journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, designated 38 at which a uniform electrostatic charge is deposited on the photoconductive layer of the xerographic drum;

An exposure station, designated 39 at which a light or radiation pattern of a copy image to be reproduced is projected onto the drum surface to dissipate the drum charge in the exposed areas thereof and thereby form an electrostatic latent image of the copy image to be reproduced;

A developing station, designated 43 at which a xerographic developing material including toner particles which may have an electrostatic charge opposite to that of the electrostatic latent image are cascaded over the drum surface, whereby the toner particles adhere to the electrostatic latent image to form a xerographic powder image in the configuration of the copy to be reproduced;

A discharge station designated 53 at which the drum surface is illuminated to completely discharge residual charges on the non-image areas of the drum surface.

A transfer station designated 44, at which the xerographic powder is electrostatically transferred from the drum surface to a transfer material or support surface; and A drum cleaning and discharge station designated 45, at which the drum surface is brushed to remove residual toner particles remaining thereon after image transfer, and at which the drum surface is exposed to a relatively bright light source to effect substantially complete discharge of any residual electrostatic charge remaining thereon.

Xerographic drum 33 is driven by a motor M–4 at a constant rate that is proportional to the scan rate of the film, whereby the peripheral rate of the drum surface is identical to the rate of movement of the reflected light image. The drum surface is sensitized prior to exposure by means of a screened corona generating device 37, which may be of the type disclosed in Vyverberg Patent 2,836,725, that is energized from a suitable high potential source.

The exposure of the drum to the light image at exposure station 39 discharges the photoconductive layer in the areas struck by light, whereby there remains on the drum a latent electrostatic image in image configuration corresponding to the light image projected from the film. As the drum surface continues its movement, the electrostatic latent image passes through developing station 43 in which a two-component developing 46 which may be of the type disclosed in Walkup Patent 2,638,416, is cascaded over the drum surface by means of developing apparatus 47.

In the developing apparatus, developing material is carried up by conveyor 48 driven by suitable means and is released onto chute 49 wherefrom it cascades down over the drum surface. As toner powder images are formed, additional toner particles must be supplied to the developing material in proportion to the amount of toner deposited on the drum. For this purpose, a toner dispenser generally designated 50 which may be of the type disclosed in copending Hunt application, S.N. 776,976, filed November 28, 1958, now U.S. Patent No. 3,013,703 is used to accurately meter toner to the developing material. After developing, the xerographic powder image passes discharge station 53 at which the drum surface is illuminated by a lamp LMP–2.

Positioned next and adjacent to the discharge station is the image transfer station 44 which includes suitable sheet feeding mechanism adapted to feed sheets of paper successively to the xerographic drum in coordination with the presentation of the developed image on the drum at the transfer station. This sheet feeding mechanism, generally designated 54 and which may be of a type disclosed in copending application S.N. 824,659, filed July 2, 1959, now U.S. Patent No. 2,945,434 in the name of R. W. Eichler et al. includes a sheet source such as a tray for a plurality of sheets of a suitable transfer material that is, typically, sheets of paper 55 or the like, a separating roller 56 adapted to feed the top sheet of the stack to feed rollers 57 and 58 which direct sheet material into contact with the rotating drum at a speed preferably in slight excess of the travel rate of the drum surface in coordination with the appearance of the developed image at the transfer station. In this manner, the sheet material is introduced between the feed rollers and is thereby brought into contact with the rotating drum at the correct time and position to register with the developed image. To effect proper registration of the sheet transfer material with the feed rollers and to direct the sheet transfer material into contact with the drum, guides are positioned on opposite sides of the feed rollers.

The transfer of the xerographic powder image from the drum surface to the transfer material is effected by means of a second corona transfer device 59 similar to corona generating device mentioned above and that is located at or immediately after the point of contact between the transfer material and the rotating drum. In operation, the electrostatic field created by the corona discharge device is effective to tack the transfer material electrostatically to the drum surface, whereby the transfer material moves synchronously with the drum while in contact therewith. Simultaneously with the tacking action, the electrostatic field is effective to attract the toner particles comprising the xerographic powder image from the drum surface and cause them to adhere electrostatically to the surface of the transfer material.

Immediately subsequent to the image transfer station is positioned a transfer material stripping apparatus or paper pick-off mechanism, generally designated 63 which may be of a type disclosed in copending application S.N. 824,658, filed July 2, 1959, now U.S. Patent No. 3,062,536 in the name of Rutkus et al., which removes the transfer material from the drum surface. This device includes a plurality of small diameter, multiple outlet conduits of a manifold that is supplied with pressurized aeriform fluid by a pulsator operated by a suitable power means. The pulsator is adapted to force jets of pressurized aeriform fluid through the outlet conduits into contact with the surface of the drum slightly in advance of the sheet material to strip the leading edge of the sheet material from the drum surface and to direct it onto an endless conveyor 64 whereby the sheet material is carried to a fixing device, such as, for example, heat fuser 65, which may be of a type disclosed in copending application S.N. 797,143, filed March 4, 1959, now U.S. Patent No. 2,965,868 in the name of R. Eichler, whereby the developed and transferred xerographic powder image on the sheet material is permanently affixed thereto.

After fusing, the finished copy is preferably discharged from the apparatus at a suitable point for collection externally of the apparatus. To accomplish this there is provided a vertical conveyor, generally designated 66, by means of which the copy is delivered to a copy holder 67 positioned in a suitable superstructure overhanging the rear portion of the desk top.

The next and final station in the device is a drum cleaning station 45, having positioned therein a drum cleaning device 68 adapted to remove any powder remaining on the xerographic drum after transfer by means of a rotating brush 69 and whereby the xerographic drum is flooded with light by lamp LMP–3 to cause dissipation of any residual electrical charge remaining on the xerographic drum.

To remove residual powder from the xerographic drum the cylindrical brush is rotatively mounted on an axle and for facilitating powder removal a corona generating device 77 which may be an adaptation of the corona generating device 37 mentioned above directs negative charge to the drum surface. For collecting powder particles removed from the xerographic drum by the brush there is provided a dust hood 70 that is formed to encompass approximately two-thirds of the brush area. To ensure thorough cleaning of the brush a flicking bar 71 is preferably secured to the interior of the dust hood adjacent the edge of the exhaust duct and in interfering relation with the ends of the brush bristles whereby dust particles may be dislodged therefrom.

For removing dust particles from the brush and dust hood, an exhaust duct 72 is arranged to cover a slot 73 that extends transversely across the dust hood and is connected to a filter bag 74 in filter box 75. A motor-fan unit 76, connected to the filter box, produces a flow of air through the filter box drawing air through the area surrounding the xerographic drum and the dust hood, the air entraining powder particles removed from the drum by the brush as the air flows through the dust hood. Powder particles are separated from the air as it flows through the filter bag so that substantially clean air reaches the motor fan unit.

Any residual electrical charge remaining on the xerographic drum is dissipated by lamp LMP–3 mounted in a suitable lamp housing hinged to the dust hood.

Suitable drive means described hereinafter drive the drum and image scanning mechanism at relatively predetermined speeds.

*Transfer Apparatus*

A typical multiple frame microfilm of a type to be reproduced is illustrated in FIG. 2 wherein letters A through L individually correspond to separate frames thereof. The films are preselected and then loaded into a magazine 16 (refer FIG. 4), which typically has three chambers 80, 81 and 82, that are, respectively, a "supply" chamber for film to be reproduced, a "retain" chamber for film held in abeyance for later consideration, and a "reject" chamber for film having been or not to be reproduced. At the lowest extremity of each chamber there is a pair of detent means 91 (see also FIG. 5) extending from each side toward the center of the chamber between which film is withdrawn and may be reinserted. The magazine is suitably supported in the xerographic machine wherefrom it may be removed for loading or unloading.

Operation of the transfer apparatus, generally designated 15, is controlled by lever 86 which is also shown in FIG. 1 protruding through the control panel 11. Slot 12 in the panel permits maneuvering the lever laterally and in turn has four separate niches, 87, 88, 89 and 90 corresponding to transfer positions respectively for reject chamber, retain chamber, supply chamber, and projection system.

Referring particularly to FIGS. 4 and 5 the transfer apparatus of the invention is illustrated arranged to transfer a microfilm from the supply chamber of the magazine to viewing platen 21 of the projection system whereat the transfer platen 109 elevated for transfer is illustrated in dashed outline. The transfer apparatus includes a transfer carriage 95 which is supported on piston 97 of air cylinder 98 and is separately moveable in a vertical direction normal to the direction of carriage movement by actuating the air cylinder as described below, there being guides in the carriage to guide the vertical movement thereof when moved by the piston. The air cylinder is suspended from the carriage and movable therewith. Arm 103 extends outward and upward from the carriage and secured thereto is block 104 supported for movement on bar 105. Lever 86 is pivotally supported within block 104 permitting the lever to be raised or lowered. Moving lever 86 laterally effects corresponding sliding of block 104 and the carriage as to shift the carriage to the desired transfer position. To ensure proper alignment of the carriage at any of the transfer positions detent 106 is resiliently mounted to fit into depression 107 of cross bar 108 of the machine.

Transfer platen 109 is substantially rectangular in shape and extends down on its side in substantially air-tight relation to the carriage. Its top surface has a plurality of small perforations and its center is hollow. The platen is arranged over an air passage 110 which extends back to a connection for air hose 111. Transfer of film between the transfer platen and the magazine or viewing platen is effected by vacuum which is generated by vacuum pump 115 and supplied to solenoids SOL–1, 2, 3, 4, 6 and 10 wherefrom it is dispensed in proper operating sequence to various components hereof.

To transfer a microfilm from the supply chamber of the magazine, lever 86 is positioned below niche 87 which places the carriage in a corresponidng transfer position with the supply chamber. Raising lever 86 closes limit switch 7LS which initiates a sequence of electrical functions as are described below in connection with FIGS. 10 and 11. However, the effect of closing the microswitch is to energize solenoid SOL–1 supplying vacuum to air cylinder 98 through hose 116 and causing piston 97 to rise. As platen 109 is raised, arm 117 extending outward therefrom closes limit switch 10LS to effect energizing of solenoid SOL–3 and apply vacuum under the perforations of the platen. The vacuum pneumatically secures a microfilm at the bottom of the stack to the transfer platen and subsequent energizing of solenoid SOL–2 while simultaneously deenergizing SOL–1, drops piston 97 withdrawing the film from the chamber. The vacuum on the platen is maintained while the carriage is shifted from the magazine to the viewing platen 21.

The viewing platen 21 is enclosed on its sides and extends upwardly to glass 118 (see FIG. 8) in substantially air tight relation. The platen has a beveled edge around its lower surface which connects to an air passage 119 extending to a connection for air hose 120. Both the glass and platen are supported in support plate 121.

Raising of lever 86 in niche 90 closes limit switch 4LS and the transfer platen is elevated as before until film thereon is in contact with the underside of viewing platen 21. To effect accurate alignment of the two platens, the transfer platen has a pair of male alignment pins designated 122, which mate with female openings 123 in the support plate. As the transfer platen is raised, extension arm 126 closes limit switches 11LS and 12SA while opening limit switch 12LSB. This effects simultaneous deenergizing and energizing of solenoid SOL–3 and SOL–4 respectively to switch vacuum from the transfer platen to the viewing platen and effect transfer of the microfilm from the former to the latter and after descent of the transfer platen the carriage is shifted back away from the projection system so as not to obstruct projection of the frame image. With the film positioned on the viewing platen, the selector means described below shifts support plate 121 until a desired image is selectively positioned into the viewing station of the optical system for visual viewing or for its reproduction effected by means of the scanning apparatus described below.

After the film has been utilized for image reproduction or it is decided not to effect its reproduction, the film is transferred back to the magazine usually to the retain or reject chambers. This is done similarly as above except that as the transfer platen is raised the vacuum application is reversed, i.e., the action of solenoids SOL–3 and SOL–4 is reversed resulting in vacuum being applied to the transfer platen while dispensing vacuum from the viewing platen to effect film transfer to the former. The carriage is then shifted to the desired chamber of the magazine and raising lever 86 effects elevating the transfer platen into the chamber as shown in the dashed outline of FIG. 5 and the circuit means described below effect release of vacuum from the plate so that on platen descent, the film is retained in the chamber by detent means 91 after which another film can be similarly transferred.

Referring also to FIGS. 10 and 11 and as stated previously transfer of a film from the magazine 16 to the carriage transport platen 109 is initiated by raising lever 86 upwardly so as to close one of limit switches 5LS, 6LS, or 7LS. With switch SW3A, operable by control knob 134 in #1 position and contacts 2CRB and 8CR2 closed, relay 3CR is closed and timer motor 1TR is energized. Through contact 3CR1A, the "lift" solenoid SOL–1 is energized while the "lower" solenoid SOL–2 is maintained de-energized through 3CR1B. Through contact 3CR2 and timer contact 1TR relay 2CR is closed after expiration of a preset time delay of 1TR which may be ¼ second.

Energizing of SOL–1 raises the transfer platen permitting arm 117 to close one of limit switches 8LS, 9LS or 10LS to close relay 4CR. Through contacts 4CRA and 14CRIB, solenoid SOL–3 is energized causing a vacuum to be applied to the transport platen 109 to pneumatically secure the film thereto. Simultaneously with the energizing of SOL–3 and through the same contacts, relay 12CR closes closing contacts 12CR1, 12CR2A and opening 12CR2B. Through contact 12CR1, relay 12CR is held in a closed position. However, opening contact 2CRB at the end of the above stated time-delay opens relay 3CR to de-energize SOL–1 and energize SOL–2 lowering the transport platen with a film held by vacuum thereon. Lowering the transport platen permits 8LS, 9LS, or 10LS to open, thus causing relay 4CR to open. When relay 4CR is returned to its normally open position, relay 14CR is closed through contacts 4CRB and 12CR2A. Relay 12CR and SOL–3 are held in an energized position through contacts 11CR and 12CR–1, thus maintaining the vacuum on the transport platen.

With a film on the transport platen, the carriage 95 is shifted to a position under the viewing platen 21. Raising lever 86 closes limit switch 4LS and as before the transport platen is elevated by the energizing of SOL–1 to present the film to the viewing platen. With the transport platen elevated, limit switches 11LS and 12LSA are simultaneously closed by extension arm 126, while 12LSB is opened. Through 11LS, relay 4CR is again closed closing relay 11CR through contacts 4CR and 14CR1A. The closing of relay 11CR opens contact 11CR thus causing relay 12CR and SOL–3 to become deenergized. With the closing of 12LSA, relay 15CR is closed, closing contacts 15CR1A, 15CR2A while opening 15CR1B and 15CR2B and SOL–4 is energized. Thereby, vacuum is exhausted from the transport platen and is applied to the viewing platen and film is transferred from the former to the latter. The vacuum is maintained on the viewing platen and limit switches 11LS and 12LS return to normal positions. With 12LSB closed, relay 17CR is closed through contact 15CR2A and contacts 17CR1A and 17CR2 close while 17CR1B opens. With the opening of limit switch 11LS, relay 4CR is opened returning 4CRA and 4CRB to normal position. With 4CRB in normal position, relay 13CR is closed, opening contact 13CR, thus causing relay 14CR to return to normal position.

After the film has been fully utilized for its viewing and/or reproduction and it is desired to return it to the magazine 16 as aforesaid the transport platen is again moved into position under the viewing platen and lever 86 is raised to close limit switch 4LS. With contacts of 4LS closed and switch SW–3A in the No. 1 position timer motor 1TR is energized and relay 3CR is closed closing contacts 3CR1A and 3CR2 while opening contacts 3CR1B. The opening of 3CR1B de-energizes SOL–2 while the closing of contacts 3CR1A energizes SOL–1. The transport platen is thus raised into virtual contact with the viewing platen, the film being therebetween. With the two platens in said last position, limit switches 11LS and 12LS are simultaneously closed as before closing contacts 11LS and 12LSA while opening contacts 12LSB. With the closing of contact 11LS relay 4CR is again closed closing contact 4CRA while opening contact 4CRB. With the opening of contact 4CRB, relay 13CR is deenergized. With the closing of contact 4CR, relay 12CR and SOL–3 are energized. As SOL–3 is energized, a vacuum is applied to the transport platen. With the closing of relay 12CR, contacts 12CR1 and 12CR2A close while contact 12CR2B opens. Closing of contacts 12LSA effects energizing relay 5CR to open contact 5CR. Opening of contact 5CR effects deenergizing of relay 15CR and SOL–4 and vacuum is removed from the viewing platen. With relay 15CR deenergized, its contacts 15CR2A, 15CR2B, 15CR1A and 15CR1B are returned to normal positions. Again SOL–1 is deenergized and SOL–2 is energized, thus lowering the transport platen, contacts 11LS, 12LSA and 12LSB are returned to normal position. With 12LSB in its normal position, relay 16CR is closed opening contacts 16CR to deenergize relay 17CR. On deenergizing of relay 17CR, contacts 17CR1A, 17CR1B, and 17CR2 are returned to normal position.

When the transport platen has been positioned to the desired magazine chamber, raising the lever 86 will close either 5LS, 6LS, or 7LS again energizing relay 3CR. This cycle will be the same as the cycle used in removing the film from the magazine except that solenoid SOL–3 is deenergized exhausting the transport vacuum and the film is permitted to be retained in the magazine by detent 91.

When any of the magazine chambers have been emptied, a plate in the chamber closes a switch 13LS, 14LS or 15LS to illuminate a lamp LMP10, 11, or 12 corresponding to the emptied chamber and located on control panel 11.

*Frame Selector Apparatus*

After a multiple frame film of the aforementioned type has been transferred to the viewing platen as above it is desired to selectively position the film in a manner such that each of its frames can alternately be centered optically to permit viewing of its image on the ground glass, after which that image can optically be scanned for xerographic reproduction as described below. By means of the frame selector apparatus, each of the images contained on the film can selectively be positioned for viewing and subsequent reproduction.

The selector mechanism generally designated 17 is illustrated in FIGS. 6 and 7 and its operation is effected by control knob 134 located on control panel 11 and illustrated in FIG. 1.

As may be seen in the plan view of FIG. 6, support plate 121 is supported between a pair of lateral support members 135 and 136 which are beveled to facilitate lateral movement of the support plate thereagainst. In turn, each of the last mentioned support members together with the support plate are supported between a pair of longitudinally arranged support members 137 and 138 which are beveled to permit longitudinal movement thereagainst of the support plate and said lateral support members.

Motor M–3 is continually operative and provides the drive for both lateral and longitudinal shifting of the film. The motor drive shaft is connected through coupling 142 to a half revolution slip clutch 143. Connected to the driven end of the clutch is shaft 144 rotatably supported in bearings and to which is secured an eccentric 145 and a gear 146. In operation the clutch is intended to continuously slip except when solenoid SOL–5 permits it to engage and when engaged, gear 146, meshing with gear 147 secured on common shaft 148 with pulley 149, transmits the drive through belt 150 to pulley 151 secured on cam shaft 152.

With the apparatus of the described embodiment and for reproducing from a multiple frame film such as illustrated in FIG. 2, it is intended that the selector will effect platen shifting to optically center the images substantially in the order A—G—B—H—C—I—D—J—E—K—F—L—A. It is therefore apparent that with the film length arranged for longitudinal movement and the width arranged for lateral movement, the film will shift longitudinally one image with every second lateral image shift.

Lateral shifting is effected by the rotation of eccentric 145 which fits snugly within collar 157 of brace 158. The brace is connected through the scanning mechanism, generally designated 159, to arm 160 through which pin 161 extends vertically and snugly into slot 162 of support plate 121. With each half revolution of shaft 144, eccentric 145 alternately effects a lateral shift of plate 121 right and then left as viewed in the drawings and it is to be noted that the scanning mechanism 159 shifts together therewith.

Longitudinal shifting is effected by the rotation of pulley 151 which drives cam shaft 152 and cylindrical cam 167 secured thereto. Cam follower 168 is located beneath the cam and moves longitudinally in conjunction with cam rotation. The follower is supported in a base 169 which is guided for movement by rod 170. Connected to the base and movable therewith are a pair of brackets 171 and 172 which connect to support member 135 and through which cam movement is transmitted to support plate 121 in which the viewing platen is supported. Spring 173 is supported in bracket 174 and is connected to the cam base to ensure follower contact against the rearward edge of the cam contour.

To initiate operation of the selector mechanism control knob 134 is dialed to a designation such as a number which is correlated to an individual letter designated frame of the film. By circuit means described below, solenoid SOL–5 is energized and its armature 177 pivots arm 178 permitting clutch 143 to engage. The solenoid remains energized until the selected frame is optically centered at which time the solenoid is deenergized to effect disengagement of the clutch.

Rotation of knob 134 operates selector switch SW–4 (refer FIG. 10). When the knob is rotated it energizes relay 6CR through the contacts of switch SW–3B which is secured to cam shaft 152 and may be an adaptation of an "oak" type switch commercially marketed by the Oak Manufacturing Co. of Chicago, Illinois. Through contacts 6CR solenoid SOL–5 is energized to permit operation of clutch 143 as described above and the solenoid remains energized until switch SW–3B is driven by the cam shaft to an open contact to deenergize the solenoid and effect disengagement of the clutch whereby the film frame corresponding to the dialed number of knob 134 will be selectively positioned.

Whereas the embodiment described is particularly adapted for a multiple frame microfilm, it is apparent that any multiple image document could similarly be positioned and thereafter projected for reproduction.

*Image Scanning Apparatus*

After the frame selector apparatus has selectively positioned a frame of the film as aforesaid and it is desired to effect xerographic reproduction of the frame-image selected, the image scanning apparatus generally designated 159 effects movement of the image past the optical axis of the projection system in timed relation to rotation of the xerographic drum, the arrangement for which is illustrated in FIGS. 4, 6, 7 and 9.

As may be seen in FIG. 9 drive for the scanning mechanism is obtained from the drum shaft 176 through gears 179 and 180. Gear 180 is secured to shaft 181 to which the drive end of single revolution slip clutch 182, which may be of a type manufactured by the Hilliard Co. of Elmira, New York, is also secured.

To initiate operation of the scanning mechanism "print" button 189 located on control panel 11 (FIG. 1) is depressed energizing solenoid SOL–7 through circuitry described below and its armature 190 retracts trip plate 191 permitting slip clutch 182 to engage. Trip plate 191 pivots about pin 192 and when the solenoid is denenergized spring 193 urges edge 194 against a protrusion of the clutch to effect a slipping disengagement thereof.

When the clutch is engaged cam shaft 183 rotates to rotate cylindrical cam 184. Cam follower 185 is located beneath the cam and is supported in a base 186 which is movable on stationary guide rods 187 and 188. Arm 160 extends from the base and moves therewith and through pin 161 is connected to the support plate 121 to effect corresponding movement thereof. Each frame when positioned by the selector apparatus is optically centered and projected by the projection system onto the ground glass for viewing by the operator. Before the image is scanned, the cam first shifts support plate 121 laterally until the edge of the image is adjacent to the projection system in position to be scanned and substantially concurrently therewith the circuit energizes solenoid SOL–6 to pneumatically energize air cylinder 128 to remove mirror 25 from obstructing the projection path to the drum. Thereafter the cam effects movement of plate whereby the selected frame-image is moved past the optical axis in scanning relation and at a rate proportional to the rotation rate of the drum to expose the image onto the previously charged drum surface. After the scan is completed the support plate is shifted to restore the image to its optically centered position and the prescanning position of mirror 25 is instantly restored by energizing SOL–10 and deenergizing SOL–6.

The operator optionally thereafter can effect another reproduction of the same image by depressing the print button again to repeat operation of the scan mechanism, can by means of the selector apparatus select another frame-image on the same film for viewing and/or reproduction or can by means of the transfer apparatus return the film to the magazine.

Solenoid SOL–10 (refer FIGS. 10 and 12) is continuously energized to maintain mirror 25 in viewing relation. Depressing print button 189 energizes relay 7CR through normally closed contacts of 2TR1B. Closing of contacts 7CR–1 and 7CR–2 serve respectively to maintain relay 7CR energized and to energize timer motor 2TR, relay 8CR and solenoid SOL–6. After expiration of a preset time delay of approximately 0.2 sec., which effectively delays operation of the scanning mechanism until the xerographic components reach operating level, 2TR is effective to (1) open 2TR1B deenergizing relay 7CR and solenoid SOL–10, (2) close contacts 2TR1A which are mechanically held thereafter for approximately 9.7 seconds, (3) through 2TR–2 energize solenoid SOL–7 to permit engagement of clutch 182 wherefrom the scanning mechanism is operative and (4) through contact 2TR3 energize paper feed solenoid SOL–8.

Energizing of relay 8CR closes contact 8CR1A while opening contact 8CR1B and through the former and normally closed contact 4TR, relay 9CR is enegrized to energize the xerographic components of the machine. After expiration of the above mentioned 9.7 seconds period the contacts of 2TR revert to their normal positions to deenergize relay 8CR and through normally closed 8CR1B permit timer motor 4TR to start. After expiration of a preset period of approximately 60 seconds, contact 4TR is opened deenergizing relay 9CR and shutting down the xerographic portion of the machine.

*Operation*

In operation the xerographic components are continuously operative whereby drum 33 constantly rotates past the several stations of charging 38, exposure 39, developing 43, discharging 53, transfer 44 and cleaning 45.

A magazine 16 previously loaded with film to be reproduced or viewed which may be of the multiple frame type mentioned above is inserted into its support means of cabinet 10. Vacuum is generated by pump 115 and, through hose connections, is available at air solenoids SOL–1, 2, 3, 4, 6 and 10. The magazine is usually comprised of three separate chambers generally designated 80, 81, and 82 and commonly referred to as the "supply," "retain" and "reject" chambers respectively from which the film are transferred and returned to the chamber appropriate for the film's subsequent use.

To transfer a film from the magazine, dial 134 on control panel 11 is first dialed to the setting #1 at which the circuit is energizable to operate the transfer components of transfer apparatus 15. By means of lever 86 transfer carriage 95 is shifted until transfer platen 109 is aligned below the magazine chamber from which a film is to be removed and is effected by aligning lever 86 with a corresponding niche 87, 88 or 89 in control panel 11. Raising lever 86 energizes circuitry to effect momentary elevating of the transfer platen into the selected chamber and a vacuum instantly applied to the underside of the platen effectively tacks the bottommost film thereto. Thereafter the transfer platen descends and lever 86 is shifted on the control panel to niche 90 which corresponds with the transfer position for transferring a film to viewing platen 21. Raising of lever 86 again effects elevating the transfer platen to place film thereon against the underside of the viewing platen. Concurrently the circuitry exhausts vacuum from the transfer platen and applies vacuum to the viewing platen to transfer the film from the former to the latter. When the transfer platen descends, the film remains adhering to the viewing platen. Thereafter lever 86 is shifted to an intermediate position between transfer positions as not to obstruct the light path and by means of the projection system an image of the film is projected onto ground glass viewing screen 27 whereat the image is viewable at increased magnification by the operator.

By means of frame selector apparatus 17, a multiple frame film of the aforementioned type can selectively be positioned to permit individual viewing of each of the frame-images, after which the selected image can be optically scanned for xerographic reproduction by means of image scanning apparatus 159.

To operate the selector apparatus control knob 134, located on control panel 11, can be dialed to any of a plurality of designations each of which correspond to one of the multiple frames on the film. With each dialed designation solenoid SOL–5 becomes energized which has the effect of permitting half revolution clutch 143 to engage and operatively connect motor M–3 to operate the selector mechanism. With each half revolution of shaft 144, eccentric 145 effects a lateral shift of support plate 121 in which the viewing platen is secured and each succeeding shift is in a direction laterally opposite to the preceding shift. Concurrently with operation of the eccentric cylindrical cam 167 is also operative and its pitch through cam follower 168 effects a longitudinal shift of the support plate with each whole revolution of clutch 143. By the combination of lateral and longitudinal shifting of the support plate each of the frame images are selectively positioned whereby they are projected onto ground-glass screen 27.

To xerographically reproduce the image selected print button 189 located on control panel 11 is depressed to initiate operation of image scanning apparatus 159. The circuitry thereby energized actuates solenoid SOL–7 permitting clutch 182 to engage to operatively connect drum shaft 176 with cylindrical cam 184. Cam follower 185 which is movable in accordance with the cam pitch and which is connected to support plate 121 effects movement of the support plate to place the image adjacent to the begin of scan position. Before the image is readied to be scanned, air cylinder 128 is actuated to retract mirror 25 and adapt the projection system 20 for projection of image onto the previously charged surface of drum 33. Thereafter the cam effects movement of the support plate and film thereon past the projection system at a predetermined rate proportional to the rotation rate of the drum whereby the film image is scanned and projected onto the drum to produce an electrostatic latent image on the drum corresponding to the film image. After scan is completed the cam immediately moves the support plate to its starting position with the film image optically centered and air cylinder 128 is again actuated to restore the position of mirror 25 to adapt the projection system for projection of image onto the screen.

By means of the xerographic apparatus the latent image thus formed is developed and transferred to a support surface 55 on which fuser 65 permanently affixes the image and which ultimately is conveyed to copy holder 67.

Other frames of the film can similarly be selected and reproduced after which the film is to be returned to magazine 16. Transfer platen 109 is restored to transfer position below the viewing platen by means of lever 86 and after control knob 134 is dialed to position #1, transfer is initiated by raising lever 86. Raising the lever effects elevating of the transfer platen against the film and an interchange of vacuum from the viewing platen to the transfer platen effects film transfer to the latter. Thereafter the transfer platen descends and the transfer carriage is shifted to a transfer position with respect to a chamber of magazine 16. Raising lever 86 again elevates the transfer platen whereby it enters the chamber with the film and by exhausting the vacuum before platen descent the film is retained in the chamber by detent means 91.

By the apparatus thus described there is disclosed a xerographic machine in which individual images of multiple frames microfilm are selectively reproduced. The machine includes a transfer apparatus for transferring a microfilm from a storage receptacle to a projection system, a selector apparatus to effect selective positioning of the film at a viewing station of the projection system whereby an individual image can be selected for reproduction, an image scanning apparatus for moving the selected image at a predetermined rate past the projection system for the purpose of scanning the image thereof and xerographic components whereby the selected image is reproduced onto a support surface.

It is to be noted that some of the circuit elements and components indicated in FIGS. 10, 11 and 12 not pertaining to the transfer, selector, or scanning apparatuses have been omitted from the discussion. Discussion of these items has been omitted since it is not essential to an understanding of the invention and components related to the xerographic process are discussed in the above first-cited Mayo et al. application.

Since many changes could be made in the above construction and many apparently widely different embodiments of this invention could be made without departing from the scope thereof, it is intended that all matter contained in the drawings shall be interpreted as illustrative and not in a limiting sense.

What is claimed is:

1. In a reproduction unit including means to support a document image substantially optically centered in projection relation to an optical mechanism, a document scan apparatus to move the document supporting support means from the optically centered position into a moving scanning relation past said optical mechanism for optically projecting a complete document image during the course of its movement, said apparatus including a cam, drive means operatively connected to said cam, and follower means responsive to the operation of said cam and operatively connected to said document support means whereby to effect movement of said document support means in accordance with pitch on said cam including a first movement in a first direction away from the substantially optically centered document image position to remove the image from optical projection relation and then a second movement in a second direction to move the image past the optical mechanism in image scanning relation thereto.

2. In a xerographic machine for the reproduction of documents wherein a document to be reproduced is moved past a projection position of an optical projection system for optically scanning a complete document image during the course of its movement, an apparatus for moving a document from a stationary substantially optically centered position into optical scanning relation, said apparatus including in combination a document support means which is movable past the projection position in projection relation to the projection system, a cam adapted to be driven at a predetermined rate, drive means, a clutch engageable to operatively connect the cam to the drive means, means to effect engagement of said clutch, and follower means responsive to the operation of said cam and operatively connected to the document support means whereby to effect movement of said document supporting support means at a rate proportional to a pitch of said cam including a first movement in a first direction away from the stationary substantially optically centered document image position to remove the image from optical projection relation and then a second movement in a second direction to move the image past the projection position in image scanning relation thereto.

3. In a xerographic machine in which a xerographic drum is mounted on a shaft journaled for rotation and which includes an optical projection system for projecting a radiation image of microfilm onto the drum surface, apparatus to move the microfilm from a stationary substantially optically centered position into scanning relation to be moved past the projection position of the projection system for projecting a complete frame of the microfilm during the course of its movement, said scanning apparatus including in combination a microfilm support means which is movable past the projection position of the projection system, a cam adapted to be driven from the drum shaft, said cam having a pitch at least partially proportional to the rotational rate of the drum, a clutch engageable to operatively connect the cam to the drum shaft, means to effect engagement of said clutch, and follower means responsive to the pitch of said cam and operatively connected to the film support means whereby to effect movement of the microfilm supporting support means including a first movement in a first direction away from the stationary substantially optically centered position to remove the microfilm image from optical projection relation and then a second movement in a reverse direction into scanning relation to move the image past the projection position in timed relation to the rotational rate of the drum.

4. In a xerographic machine in which a xerographic drum is mounted on a shaft journaled for rotation and which includes an optical projection system having means adapted alternatively to project a radiation image of microfilm either onto the drum surface or from a stationary substantially optically centered position onto a viewing surface, an image scanning apparatus operative in conjunction with the projection of a microfilm image onto the drum surface, said scanning apparatus including in combination a microfilm support means which is movable past the projection system for projecting a complete microfilm image during the course of its movement, a cam adapted to be driven from the drum shaft, said cam having a pitch at least partially proportional to the rotational rate of the drum, a clutch engageable to operatively connect the cam to the drum shaft, means to effect engagement of said clutch, a cam follower responsive to the operation of said cam and operatively connected to move the film support means, said cam being effective to move the microfilm supporting support means in a plurality of sequential moves including movement in a first direction away from said stationary substantially optically centered surface viewing position into position to be scanned and removed from optical projection relation, movement in a reverse direction past the projection system to optically scan the image projected onto the drum in timed relation to the rotational rate of the drum and movement again in said first direction to restore the image to said surface viewing position; and means operative substantially concomitantly with said first recited movement of the support means whereby to adapt the projection system for image projection onto the drum surface when the microfilm reaches scanning position.

5. In a xerographic machine for reproduction of copy in which a xerographic plate is moved at constant rate and which includes an optical projection system to project a radiation image of a multiple image microfilm onto the plate surface, film support means movable past the projection system in projection relation to the projection system and a selector mechanism connected to the film support means whereby each image of the film can alternatively be positioned selectively for reproduction, apparatus for moving a selected microfilm image from a stationary substantially optically centered position into optical scanning relation for a complete projection thereof onto the plate surface, said apparatus including in combination a cam adapted to be driven at a predetermined rate, said cam having a pitch at least partially proportional to the rate of plate movement, drive means, a clutch engageable to operatively connect the cam to said drive means, means to effect engagement of said clutch, a cam follower responsive to operation of said cam and operatively connected to the film support means to effect microfilm movement including a first movement in a first direction whereby a selected film image is moved away from the substantially optically centered position of the projection position to remove the microfilm image from optical projection relation and then a second movement in a second direction to move the film image past the projection position of the projection system to optically scan the image in timed relation to the rate of plate movement.

6. A document scan apparatus to move a document from a substantially optically centered projection position of an optical mechanism into a moving scanning relation past said optical mechanism for optically scanning the complete document image during the course of its movement, said apparatus including in combination a document support means movable past the projection position in projecting relation to an optical mechanism, and drive means operatively connected to said support means to provide bidirectional movement thereof, including a reciprocally operable arm member connected to said support means and adapted when moving in a first direction to effect document movement from substantially optically centered position to a position optically removed from projection relation and when moving in a second direction to advance a document on its support means into scanning relation to be moved unidirectionally past the projection position at a predetermined rate.

References Cited in the file of this patent

UNITED STATES PATENTS

| | | |
|---|---|---|
| 2,130,562 | Pratt | Sept. 20, 1938 |
| 2,256,397 | Luboshez | Sept. 16, 1941 |
| 2,703,280 | Butterfield et al. | Mar. 1, 1955 |
| 2,807,190 | Oldenbloom | Sept. 24, 1957 |
| 2,880,647 | Swinnerton | Apr. 7, 1959 |
| 2,878,718 | Post | Mar. 24, 1959 |
| 2,959,095 | Magnusson | Nov. 8, 1960 |
| 2,986,967 | Albert et al. | June 6, 1961 |